(12) United States Patent
Newstadt et al.

(10) Patent No.: US 8,578,009 B1
(45) Date of Patent: Nov. 5, 2013

(54) SYSTEMS AND METHODS FOR CORRELATING ONLINE ALIASES WITH REAL-WORLD IDENTITIES

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 999 days.

(21) Appl. No.: 11/960,402

(22) Filed: Dec. 19, 2007

(51) Int. Cl.
*G06F 15/16* (2006.01)
*G06F 15/177* (2006.01)

(52) U.S. Cl.
USPC .......................... 709/223; 709/206; 709/236

(58) Field of Classification Search
USPC .......................... 709/200, 206–207, 223, 236
See application file for complete search history.

(56) References Cited

U.S. PATENT DOCUMENTS

| | | | |
|---|---|---|---|
| 7,237,201 B2 * | 6/2007 | Fish | 715/753 |
| 7,428,750 B1 | 9/2008 | Dunn et al. | |
| 7,673,327 B1 * | 3/2010 | Polis et al. | 726/5 |
| 7,734,708 B1 * | 6/2010 | Fletcher | 709/207 |
| 7,904,558 B2 | 3/2011 | Malik | |
| 2004/0254991 A1 * | 12/2004 | Malik et al. | 709/206 |
| 2005/0027817 A1 | 2/2005 | Novik et al. | |
| 2007/0203954 A1 | 8/2007 | Vargas et al. | |
| 2007/0226304 A1 | 9/2007 | Virk et al. | |
| 2007/0293212 A1 | 12/2007 | Quon et al. | |
| 2008/0059627 A1 * | 3/2008 | Hamalainen et al. | 709/224 |
| 2008/0134295 A1 * | 6/2008 | Bailey et al. | 726/4 |
| 2008/0244020 A1 | 10/2008 | Dolan | |
| 2008/0261569 A1 | 10/2008 | Britt et al. | |
| 2009/0006202 A1 * | 1/2009 | Alroy | 705/14 |
| 2009/0138562 A1 | 5/2009 | Schmulen et al. | |

OTHER PUBLICATIONS

Non-Final Office Action received in related U.S. Appl. No. 11/956,016; Sep. 24, 2009.
Final Office Action received in related U.S. Appl. No. 11/956,016; Mar. 5, 2010.
Non-Final Office Action received in U.S. Appl. No. 11/956,016, dated Feb. 15, 2012.

\* cited by examiner

*Primary Examiner* — Patrice Winder
(74) *Attorney, Agent, or Firm* — ALG Intellectual Property, LLC

(57) ABSTRACT

A computer-implemented method for correlating online aliases with real-world identities may comprise accessing a first user account associated with a first online communication mechanism, obtaining contact data associated with a first online alias from the first user account, identifying contact data associated with a second online alias, identifying, by comparing the contact data associated with the first online alias with the contact data associated with the second online alias, at least one common characteristic between the first online alias and the second online alias, and associating both the first online alias and the second online alias with a common contact. A graphical user interface may display a contact's name, online aliases for by the contact, and the online communication mechanisms that may be used to communicate with the contact. The method may also facilitate communication with a contact using online communication mechanisms. Corresponding systems and computer-readable media are also disclosed.

18 Claims, 12 Drawing Sheets

FIG. 5

| Contact Data Associated with First Online Alias 500 | |
|---|---|
| Name: | John R. Smith |
| Home Phone: | |
| Work Phone: | 1-811-413-4679 |
| Cell Phone: | 1-912-376-9861 |
| Home Address | |
| Work Address | 56789 Park Ave, NY |
| Email Address | jsmith@gmail.com |
| IM Address | |
| Website | |
| Online Alias | John R. Smith |

| Contact Data Associated with Second Online Alias 510 | |
|---|---|
| Name: | |
| Home Phone: | 1-123-456-1291 |
| Work Phone: | |
| Cell Phone: | 1-912-376-9861 |
| Home Address | 1234 Anywhere St., NV |
| Work Address | |
| Email Address | |
| IM Address | johnny boy |
| Website | www.smitty.com |
| Online Alias | smitty |

| Contact Record 520 | |
|---|---|
| Name: | John R. Smith |
| Home Phone: | 1-123-456-1291 |
| Work Phone: | 1-811-413-4679 |
| Cell Phone: | 1-912-376-9861 |
| Home Address | 1234 Anywhere St., NV |
| Work Address | 56789 Park Avenue, NY |
| Website | www.smitty.com |
| Online Aliases | AIM: johnny boy<br>GMAIL: jsmith<br>MYSPACE: smitty<br>LINKEDIN: John R. Smith |

FIG. 9

| Contact Name 902 | Home Address 904 | Work Address 906 | Phone Numbers 908 | Online Aliases 910 |
|---|---|---|---|---|
| John R. Smith | 1234 Anywhere St. Las Vegas, NV 57342 | 56789 Park Avenue NY, NY 23009 | (H):1-123-456-1291 (W):1-811-413-9861 (C):1-915-376-9861 (F):1-878-461-5324 | GMAIL: jsmith [CONTACT]<br>AIM: johnny boy [CONTACT]<br>MYSPACE: smitty [CONTACT]<br>LINKEDIN: John R. Smith [CONTACT]<br>EBAY: john.s [CONTACT] |
| Susan Brown | 4321 Somewhere St. Orem, UT 98765 | N/A | (H):1-123-654-9876 | HOTMAIL: suebrown [CONTACT]<br>FACEBOOK: sb01 [CONTACT]<br>AIM: susan4ever [CONTACT] |

900

912

SYSTEMS AND METHODS FOR CORRELATING ONLINE ALIASES WITH REAL-WORLD IDENTITIES

BACKGROUND

Online communication mechanisms, such as web-based email services, instant-messaging services, and social-networking websites, allow users to communicate with and meet others in a variety of ways. For example, a user may communicate with a friend, family member, or other acquaintance by sending an email or instant message, by posting a message on a message board, or by sending a message via a social or professional-networking website.

Online communication mechanisms typically identify users by assigning or allowing users to choose a distinct online alias, such as a username or handle. Because individuals are often users of multiple online communication mechanisms, a single individual may have multiple online aliases. For example, an individual may choose or be assigned the username "Joey B" for a social-networking website, the handle "bradfordj" for an instant-messaging service, and the username "jybrad" for a web-based email service.

Due to the large number of online communication mechanisms available, manually identifying or remembering the various online aliases used by friends or family members may prove problematic. Moreover, even if an individual expends the time and effort required to identify these online aliases, an even greater amount of time and effort may be required to manage this information and keep it up-to-date.

SUMMARY

As will be described in greater detail below, embodiments of the instant disclosure may be used to identify the various online aliases used by friends, family members, and other acquaintances of a user and then correlate these online aliases with their real-world identities. For example, in one embodiment a computer-implemented method for identifying and correlating online aliases may comprise obtaining contact data for a first online alias, obtaining contact data for a second online alias, identifying, by comparing the contact data for the first online alias with the contact data for the second online alias, at least one common characteristic between the first online alias and the second online alias, and associating both the first online alias and the second online alias with a common contact or identity. Common characteristics between online aliases that may be identified include names, online aliases, email addresses, phone numbers, fax numbers, mailing addresses, website addresses, and instant-messaging addresses.

The method may also comprise accessing user accounts associated with online communication mechanisms in order to obtain contact data for online aliases from these user accounts. These user accounts may be accessed by either receiving login information for the user account from a user or retrieving login information for the user account from a login-information database and then using that login information to log into and access the user account. In one embodiment, online communication mechanisms may be accessed using mechanism-specific access modules or plug-ins that may be tailored to access specific online communication mechanisms or services.

Data or information may be obtained from user accounts associated with online communication mechanisms in a variety of ways; including, for example, by extracting human-readable data from an online communication mechanism (e.g., screen scraping data from a display output of an online communication mechanism) or by receiving computer-readable data from an online communication mechanism.

Online aliases may be associated with a common contact or identity by creating a contact record that: 1) identifies each online alias used by the contact and 2) contains contact information for the contact. The contact record may be stored in a contact-management database. A graphical user interface may also be provided for displaying a contact's name, each of the online aliases used by the contact, and the online communication mechanisms that may be used to communicate with the contact. The method may also comprise facilitating communication with a contact using these online communication mechanisms.

Online aliases may be correlated automatically and periodically or at the request of a user. Corresponding systems and computer-readable media for synchronizing online communities are also provided.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of an exemplary contact record according to at least one embodiment.

FIG. 9 is a block diagram of an exemplary graphical user interface capable of implementing one or more of the embodiments described and/or illustrated herein.

Figure 1:
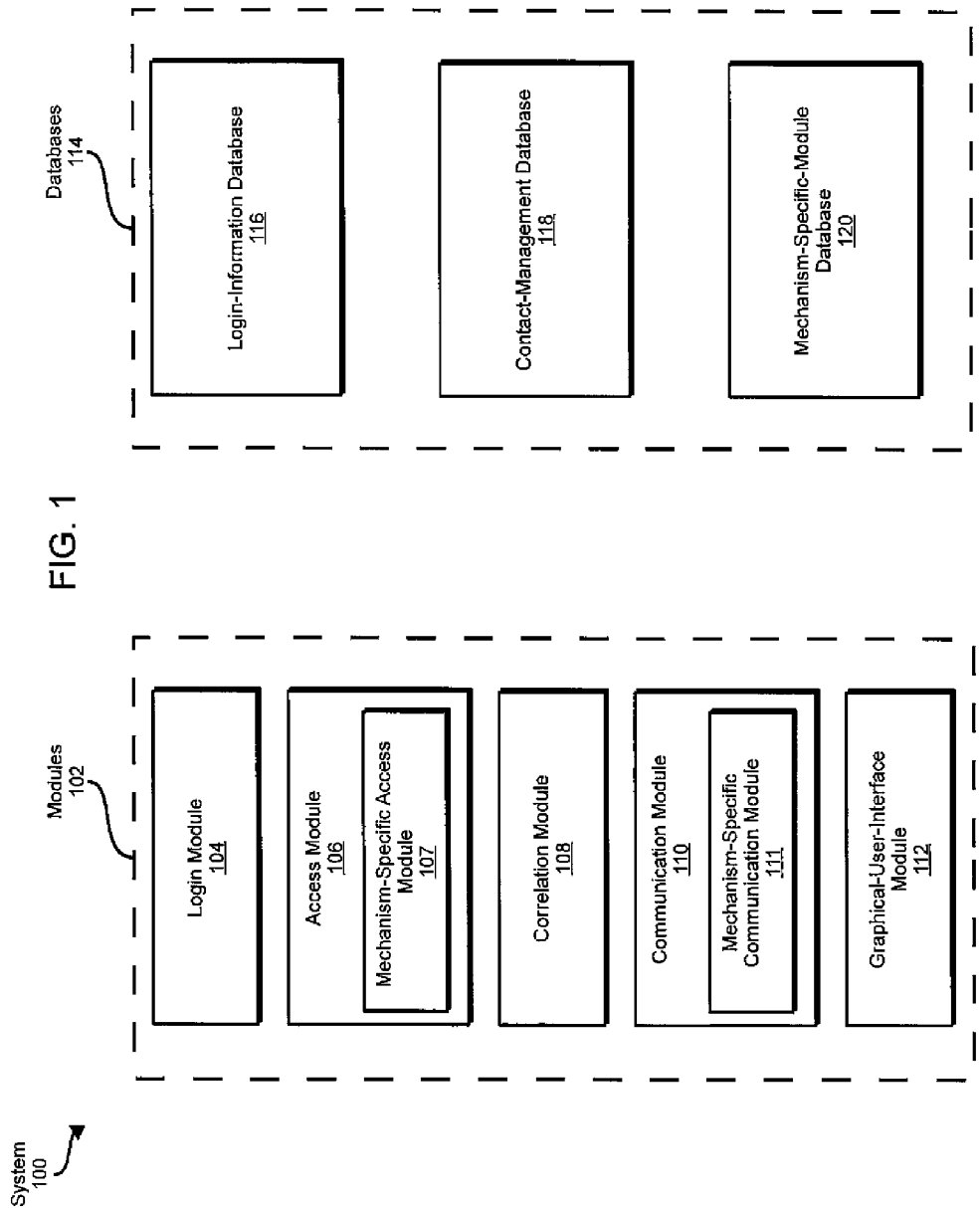
FIG. 1 is a block diagram of an exemplary system for correlating online aliases with real-world identities according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure relates generally to computer-implemented methods and systems for identifying and correlating online aliases with real-world identities. As noted above, the phrase "online alias" may generally refer to an identifier assigned to or chosen by a user of an online communication mechanism. Examples of online aliases include, without limitation, usernames (used, for example, by social and professional-networking sites, message boards, and the like), handles (used, for example, by instant-messaging services), local portions of email addresses (i.e., the portion of an email address that precedes the domain-name portion of an email address), or any other suitable identification mechanism.

As used herein, the terms "contact," "online contact," or "identity" generally refer to a friend, family member, or other acquaintance of a user of an online communication mechanism. In addition, the phrase "online communication mechanism" may generally refer to any type or form of virtual communication mechanism. Examples of online communication mechanisms include, without limitation, web-based email services (such as YAHOO! and GMAIL), instant-messaging services, text-messaging services, social and professional-networking websites (such as LINKEDIN, FACEBOOK, and MYSPACE), contact-management services (such as PLAXO), news groups, message boards, peer-to-peer communities, or any other virtual community.

FIG. 1 is an illustration of an exemplary system 100 for identifying and correlating online aliases with real-world identities. As illustrated in FIG. 1, exemplary system 100 may comprise one or more modules 102 for implementing one or more of the embodiments described and/or illustrated herein. For example, exemplary system 100 may comprise a login module 104 for managing login information for user accounts for online communication mechanisms, an access module 106 for accessing and obtaining information from user accounts for online communication mechanisms, a correlation module 108 for correlating online aliases with real-world identities, a communication module 110 for facilitating communication with contacts via online communication mechanisms, and a graphical-user-interface module 112 for providing a graphical user interface.

In certain embodiments, and as will be described in greater detail below, access module 106 may comprise one or more mechanism-specific access modules or plug-ins 107 that may be specifically configured to provide access to specific online communication mechanisms. Similarly, in at least one embodiment communication module 110 may comprise one or more mechanism-specific communication modules or plug-ins 111 that may be specifically configured to facilitate communication with contacts via specific online communication mechanisms.

As illustrated in FIG. 1, exemplary system 100 may also comprise one or more databases 114. For example, exemplary system 100 may comprise a login-information database 116 for storing login information for accessing user accounts for online communication mechanisms, a contact-management database 118 for storing contact data obtained from user accounts and contact records created for contacts, and a mechanism-specific-module database 120 for storing mechanism-specific access modules 107 and mechanism-specific communication modules 11. Although illustrated as separate devices, one or more of databases 114 may represent portions of a single database or a single computing device.

In certain embodiments, one or more of modules 102 may represent one or more software applications or programs that, when executed by a computing device, may cause the computing device to perform one or more of the embodiments described and/or illustrated herein. For example, as will be described in greater detail below, one or more of modules 102 may represent software modules configured to run on one or more computing devices, such as computing device 202 in FIG. 2, client 302 in FIG. 3, or server 310 in FIG. 3. One or more of modules 102 may also represent all or portions of one or more special-purpose computers configured to perform one or more of the embodiments described and/or illustrated herein.

In addition, one or more of databases 114 may represent a portion of one or more computing devices. For example, login-information database 116, contact-management database 118, and/or mechanism-specific-module database 120 may represent a portion of a computing device, such as computing device 202 in FIG. 2, client 302 in FIG. 3, and/or server 310 in FIG. 3. Alternatively, one or more of databases 114 may represent one or more physically separate devices capable of being accessed by a computing device, such as computing device 202 in FIG. 2, client 302 in FIG. 3, or server 310 in FIG. 3.

Figure 2:
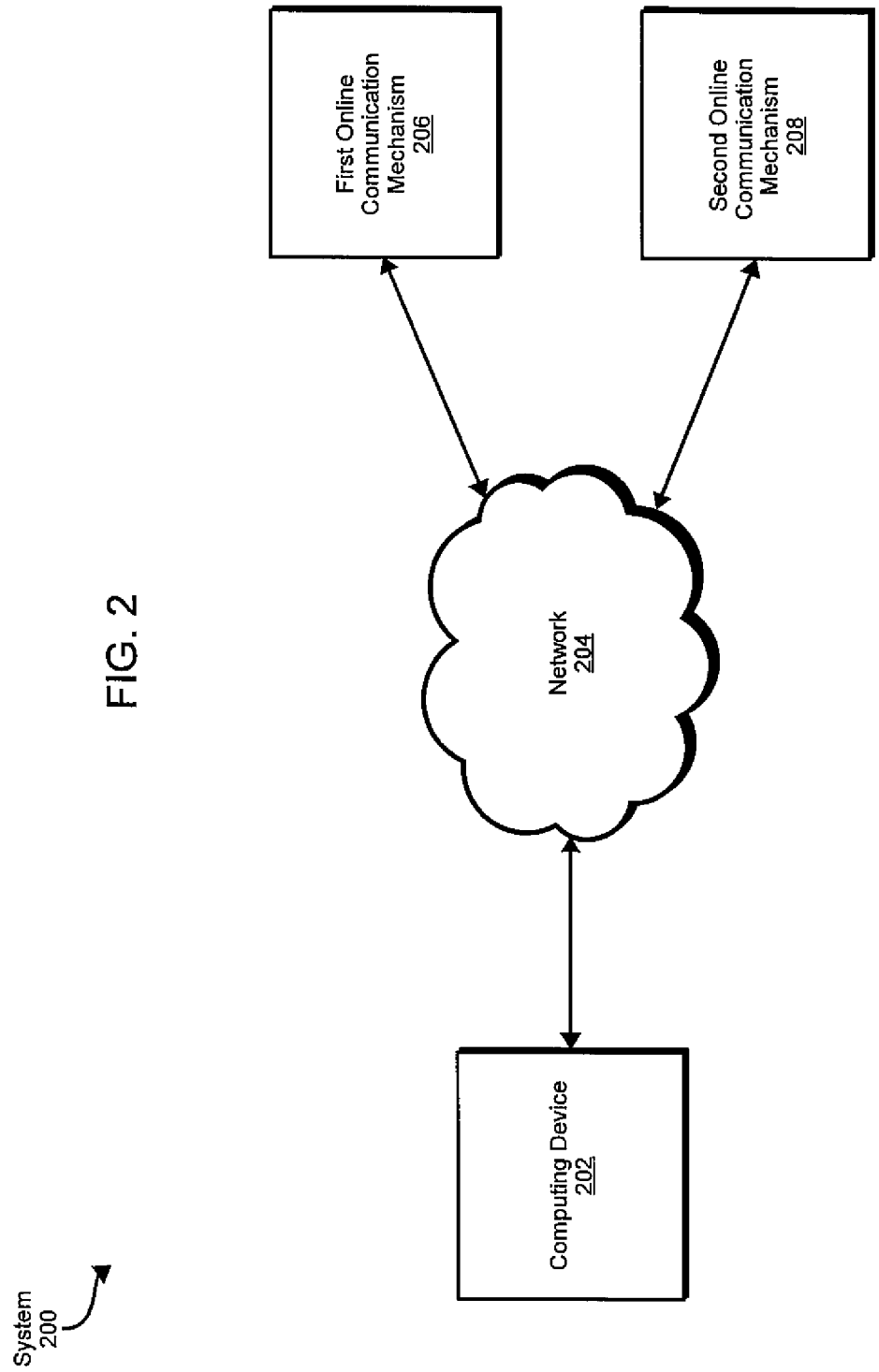
FIG. 2 is a block diagram of an exemplary client-based system for correlating online aliases with real-world identities according to certain embodiments.

Exemplary system 100 in FIG. 1 may be deployed in a variety of ways. For example, all or a portion of exemplary system 100 may represent portions of a client-based system or a network-based system. FIG. 2 is an illustration of an exemplary client-based system 200 capable of identifying and correlating online aliases with real-world identities. As illustrated in this figure, system 200 may comprise a computing device 202 in communication with a first online communication mechanism 206 and a second online communication mechanism 208 via a network 204.

Computing device 202 generally represents any type or form of device capable of executing computer-readable instructions. A detailed description of an exemplary computing device is provided below in connection with FIG. 10. In certain embodiments, computing device 202 may comprise one or more portions of exemplary system 100 in FIG. 1. For example, one or more of modules 102 from FIG. 1 may be stored and configured to run an computing device 202. Similarly, computing device 202 may comprise one or more of databases 114 in FIG. 1.

In at least one embodiment, computing device 202 may communicate with first online communication mechanism 206 and second online communication mechanism 208 via network 204. Network 204 generally represents any type of communication or computing network; including, for example, an intranet, a wide area network (WAN), a local area network (LAN), a personal area network (PAN), or the Internet.

First online communication mechanism 206 and second online communication mechanism 208 generally represent any type or form of online communication mechanism. Examples of first online communication mechanism 206 and second online communication mechanism 208 include, without limitation, web-based email services (such as YAHOO! and GMAIL), instant-messaging services, text-messaging services, social and professional-networking websites (such as LINKEDIN, FACEBOOK, MYSPACE), contact-management services (such as PLAXO), news groups, message boards, peer-to-peer communities, or any other virtual community.

Although not illustrated, in certain embodiments first online communication mechanism 206 and second online communication mechanism 208 may comprise at least one computing device (such as a server) for facilitating communication between one or more client-side terminals operated by one or more users of the online communication mechanisms. First online communication mechanism 206 and second online communication mechanism 208 may also comprise one or more databases for storing data. Examples of the type of data that may be stored in these databases include, without limitation, user-login information, user-account-settings information, contact records containing contact information or data for friends, family members, or acquaintances of a user, or any other form of data, such as messages posted, sent, or received by a user.

As will be described in greater detail below, exemplary system 200 may enable a user of a plurality of online communication mechanisms, such as first online communication mechanism 206 and second online communication mechanism 208, to identify and correlate the online aliases used by friends and acquaintances of the user with their real-world identities. For example, as will be described in greater detail below, one or more of modules 102 may cause computing device 202 in FIG. 2 to access and collect contact data from first online communication mechanism 206 and second online communication mechanism 208 and then use this contact data to identify and correlate the online aliases of the user's friends with their real-world identities. As will be described in greater detail below, exemplary system 200 may also be used to facilitate communication between a user and his or her friends via one or more online communication mechanisms.

Figure 3:
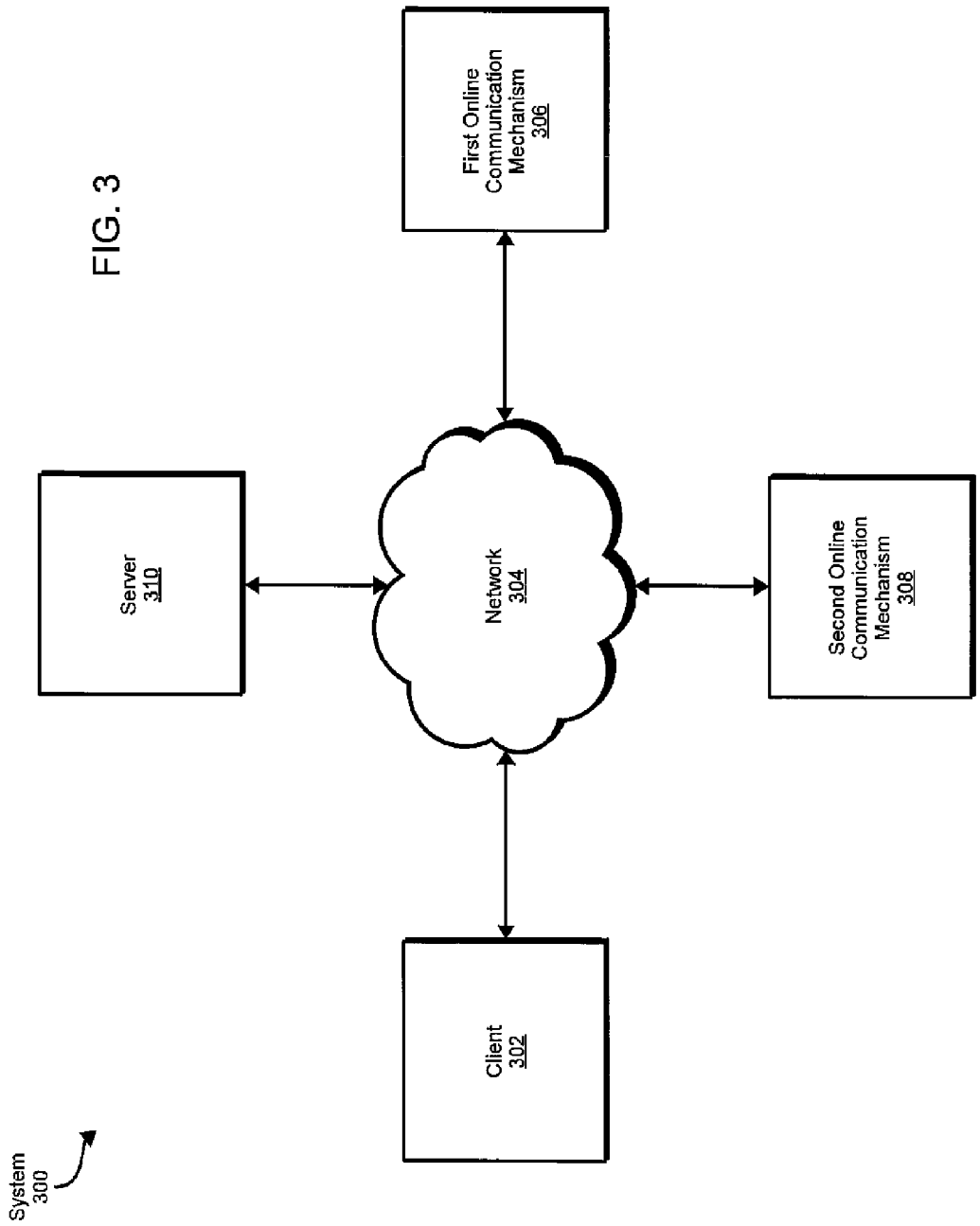
FIG. 3 is a block diagram of an exemplary network-based system for correlating online aliases with real-world identities according to certain embodiments.

As detailed above, in certain embodiments all or a portion of exemplary system 100 in FIG. 1 may also be deployed within a network-based system. FIG. 3 is an illustration of an exemplary network-based system 300 capable of identifying and correlating online aliases with real-world identities. As illustrated in this figure, exemplary system 300 may comprise a client computing device 302 in communication with a first online communication mechanism 306, a second online communication mechanism 308, and a server computing device 310 via a network 304. Client 302 generally represents any type or form of client-side computing device. Similarly, server 310 generally represents any type or form of server-side computing device.

In certain embodiments, server 310 may comprise one or more portions of exemplary system 300 in FIG. 1. For example, one or more of modules 102 from FIG. 1 may be stored and configured to run on server 310. Similarly, server 310 may comprise one or more of databases 114 in FIG. 1. In this embodiment, a user of client 302 may identify and correlate the online aliases used by friends or acquaintances of the user by accessing server 310 via network 304. For example, as will be described in greater detail below, server 310 may, either automatically or upon receiving a request from client 302, access and collect contact data from first online communication mechanism 306 and second online communication mechanism 308 and then use this contact data to identify and correlate the online aliases of the user's friends with their real-world identities. As will be described in greater detail below, server 310 may also facilitate communication between a user of client 302 and his or her friends via one or more online communication mechanisms.

Figure 4:
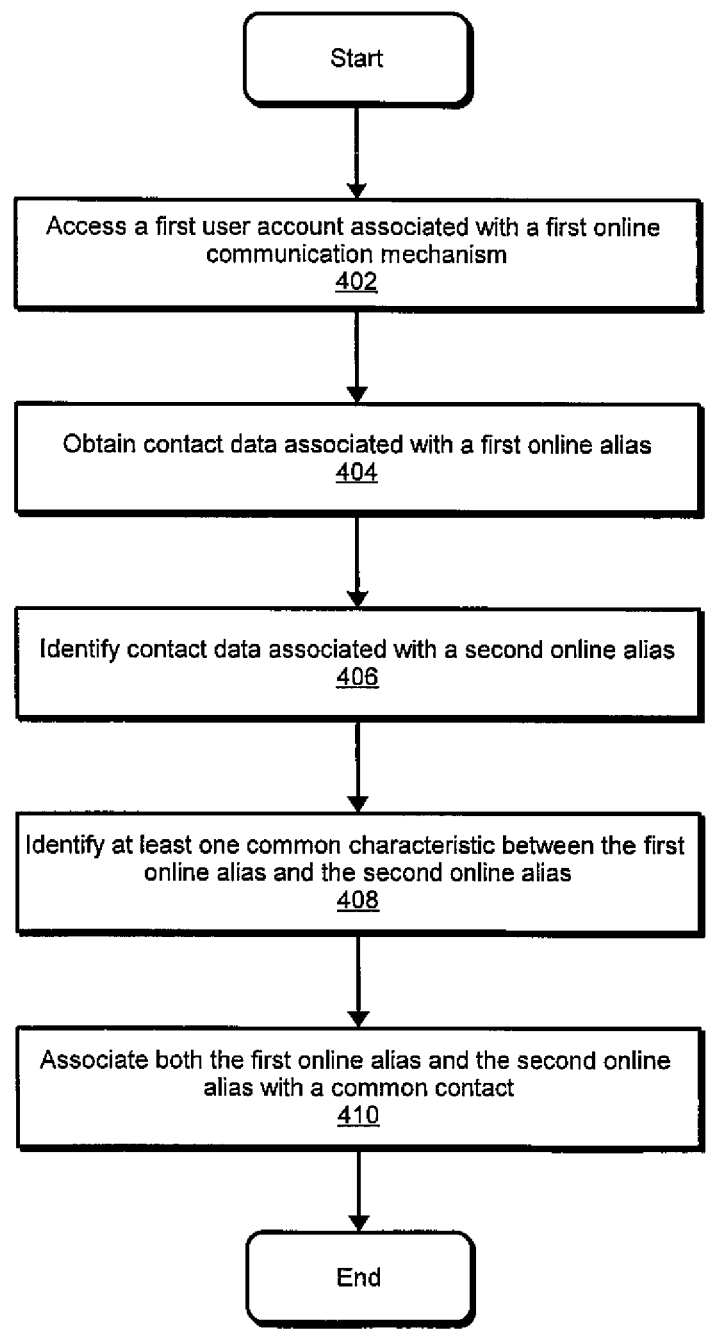
FIG. 4 is a flow diagram of an exemplary computer-implemented method for correlating online aliases with real-world identities according to at least one embodiment.

FIG. 4 is a flow diagram of an exemplary computer-implemented method 400 for identifying and correlating online aliases with real-world identities. As illustrated in this figure, at step 402 a computing device (such as computing device 202 in FIG. 2, client 302 in FIG. 3, or server 310 in FIG. 3) may access a first user account associated with a first online communication mechanism, such as first online communication mechanism 206 in FIG. 2 or first online communication mechanism 306 in FIG. 3.

User accounts for an online communication mechanism may be accessed in a variety of ways. For example, in certain embodiments a computing device may access a user account associated with an online communication mechanism by locating and retrieving, using a login module such as login module 104 in FIG. 1, login information for the user account from a login-information database, such as login-information database 116 in FIG. 1. The computing device may then use that login information to log into the user account. In an alternative embodiment, a computing device may access a user account for an online communication mechanism by receiving login information for the user account from a user and then using that login information to log into the user account. In certain embodiments, an access module, such as access module 106 in FIG. 1, may be used to access user accounts. User accounts may also be accessed using mechanism-specific access modules, such as mechanism-specific access module 107 in FIG. 1, as will be explained in greater detail below in connection with FIG. 6.

At step 404, the computing device may obtain contact data associated with a first online alias from the first user account. Any type or form of contact information or data associated with an online alias may be obtained from the first user account; including, for example, both computer-readable and human-readable data. Examples of contact data associated with an online alias include, without limitation, a name of a contact, an online alias for a contact, an email address for a contact, a phone number for a contact, a fax number for a contact, a mailing address for a contact, a website address for a contact, an instant-messaging address for a contact, or any other potentially useful information.

Information or data may be obtained from user accounts in a variety of ways. In one embodiment, computer-readable data may be received from an online communication mechanism in response to a request transmitted by a computing device. For example, access module 106 may cause computing device 202 to instruct first online communication mechanism 206 to export computer-readable data, such as contact data, from a first user account associated with first online communication mechanism 206 to computing device 202.

Data may also be obtained from online communication mechanisms by "screen scraping" or extracting data from a display output of the online communication mechanism. For example, access module 106 may cause computing device 202 in FIG. 2 to: 1) identify data displayed in human-readable form by first online communication mechanism 206, 2) screen scrape or extract this human-readable data from first online communication mechanism 206, 3) convert this human-readable data into computer-readable data, and then 4) store this computer-readable data in contact-management database 118.

At step 406, the computing device may identify contact data associated with a second online alias. This contact data may be identified in a variety of ways. For example, in certain embodiments, and as will be described in greater detail below in connection with FIG. 6, identifying contact data associated with the second online alias may comprise identifying login information for a second user account associated with a second online communication mechanism, accessing the second user account using the login information, and then obtaining the contact data associated with the second online alias from the second user account. In an alternative embodiment, identifying contact data associated with the second online alias may comprise retrieving contact data associated with the second online alias from a contact-management database, such as contact-management database 118 in FIG. 1.

At step 408, the computing device may identify, by comparing the contact data associated with the first online alias with the contact data associated with the second online alias, at least one common characteristic between the first online alias and the second online alias. Common characteristics between online aliases may be identified in a variety of ways. In at least one embodiment, identifying at least one common characteristic between online aliases may comprise identifying at least one common name, online alias, email address, phone number, fax number, mailing address, website address, instant-messaging address, or other potentially relevant characteristic.

For example, at step 408 correlation module 108 may cause a computing device, such as computing device 202 in FIG. 2, client 302 in FIG. 3, or server 310 in FIG. 3, to compare contact data associated with the first online alias with contact data associated with the second online alias to determine whether any portion of the contact data associated with the online aliases is the same. For example, as will be described in greater detail below in connection with FIG. 5, the computing device may determine whether an email address associated with the first online alias matches an email address associated with the second online alias.

If the computing device identifies at least one common characteristic between the first online alias and the second online alias, then at step 410 the computing device may associate both the first online alias and the second online alias with a common contact or identity. Online aliases may be associated with a common contact or identity in a variety of ways. For example, and as will be described in greater detail below in connection with FIGS. 7 and 8, associating online aliases with a common contact or identity may comprise creating or modifying a contact record for a contact that contains data identifying at least the first online alias, the second online alias, and contact information or data for the contact.

The phrase "contact record" may generally refer to a data record containing contact information for a friend, family member, or acquaintance of a user. Examples of the type of contact information that may be contained in a contact record include, without limitation, the name of a contact, an email address for a contact, a phone number for a contact, a fax number for a contact, a mailing address for a contact, a website address for a contact, or any other potentially useful information. In at least one embodiment, contact records may also contain information identifying the various online aliases of a contact. In certain embodiments, contact records may be stored in a contact management database, such as contact-management database 118 in FIG. 1. FIG. 5, which will be discussed in greater detail below, provides an illustration of an exemplary contact record 520.

Figure 8:
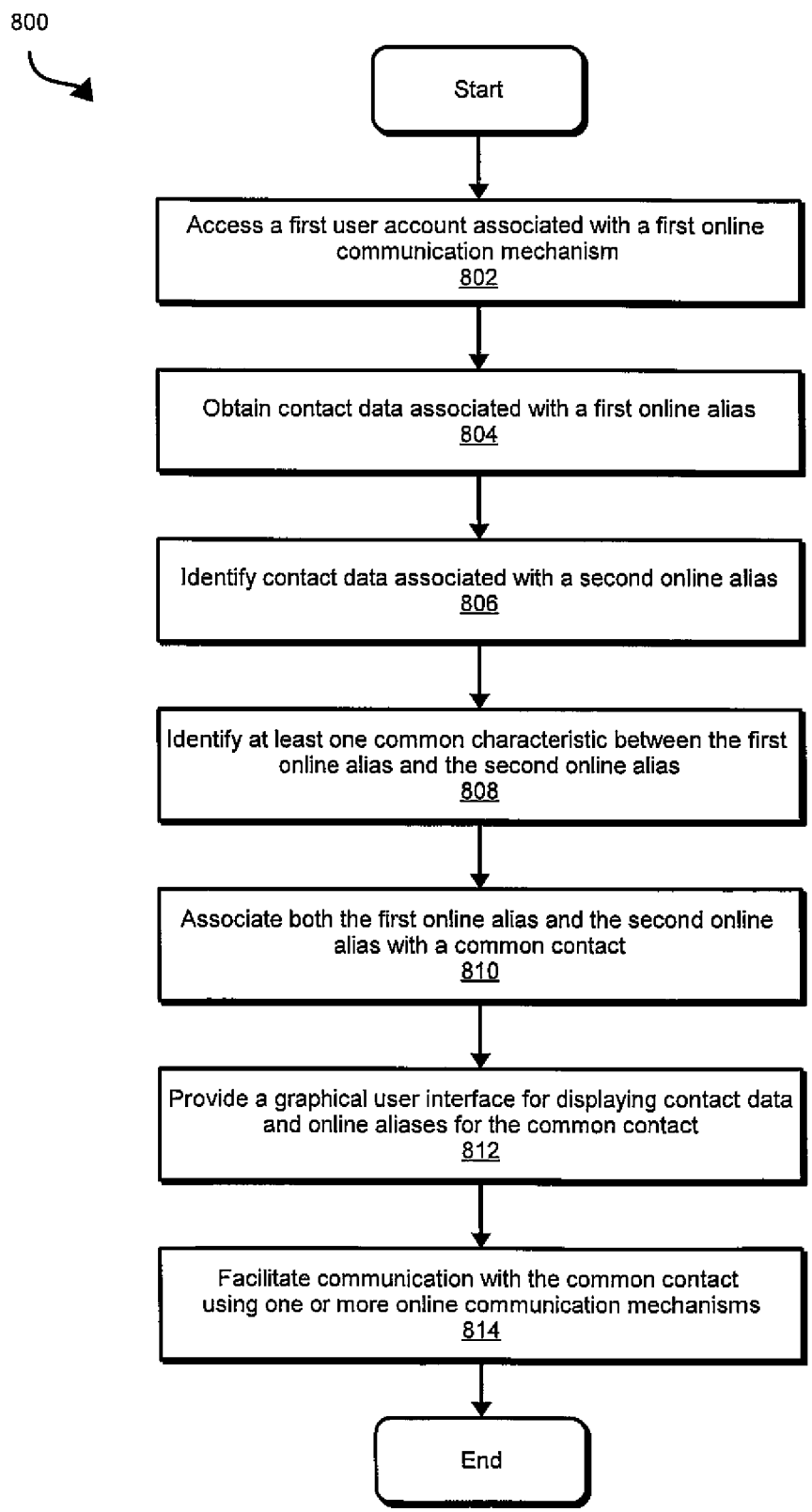
FIG. 8 is a flow diagram of an exemplary computer-implemented method for correlating online aliases with real-world identities according to an additional embodiment.

As will be described in greater detail below in connection with FIGS. 8 and 9, associating online aliases with a common contact or identity may also comprise displaying, using a graphical user interface, the various online aliases of a contact. Upon completion of step 410 in FIG. 4, exemplary method 400 may terminate.

For the sake of clarity, and by way of example only, the following detailed description will provide, with reference to FIGS. 1, 2, 4, and 5 an illustration of how exemplary method 400 may be implemented. In this example, computing device 202 in FIG. 2 may represent a user's PC, first online communication mechanism 206 may represent a professional-networking website, such as LINKEDIN, and second online communication mechanism may represent a social-networking website, such as MYSPACE. One or more of modules 102 in FIG. 1 may be installed and configured to run on computing device 202, which also comprise one or more of databases 114.

In this example, at step 402 in FIG. 4 login module 104 and/or access module 106 in FIG. 1 may cause computing device 202 in FIG. 2 to access a first user account associated with first online communication mechanism 206 in FIG. 2. For example, login module 104 may cause computing device 202 to retrieve login information for a first user account associated with first online communication mechanism 206 (which, in this case, is a professional-networking website) from login-information database 116. Access module 106 may then cause computing device 202 to log into the first user account associated with first online communication mechanism 206 using the login information retrieved from login-information database 116.

At step 404, access module 106 may cause computing device 202 to obtain contact data from the first user account. For example, computing device 202 may identify and obtain contact data for at least one online alias from the first user account. As illustrated in box 500 in FIG. 5, in this example this contact data may identify the name of a contact (John R. Smith), a work phone number for the contact ("1-811-413-4679"), a cell phone number for the contact ("1-912-376-9861"), a work address for the contact ("56789 Park Ave, NY"), an email address for the contact ("jsmith@gmail.com"), and a username or online alias for the contact ("John R. Smith") used in connection with first online communication mechanism 206 (which, in this case, is a professional-networking website).

At step 406, computing device 202 may identify contact data associated with a second online alias by: 1) retrieving login information for a second user account associated with second online communication mechanism 208 (which, in this case, may be a social-networking website) from login-information database 116, 2) logging in to the second user account using the login information retrieved from login-information database 116, and 3) obtaining contact data from the second user account.

As illustrated in box 510 in FIG. 5, in this example the contact data obtained from the second user account may identify a home phone number for a contact ("1-123-456-1291"), a cell phone number for the contact ("1-912-376-9861"), a home address for the contact ("1234 Anywhere St, NV"), an IM address for the contact ("johnny boy"), a website for the contact ("www.smitty.com"), and a username or online alias for the contact ("smutty") used in connection with second online communication mechanism 208 (which, in this case, is a social-networking website, such as MYSPACE).

At step 408, correlation module 108 may cause computing device 202 to identify, by comparing the contact data associated with the first online alias in box 500 with the contact data associated with the second online alias in box 510, at least one common characteristic between the first online alias and the second online alias. In this example, computing device 202 may determine that a cell phone number associated with both the first online alias in box 500 and the second online alias in box 510 is identical.

Upon identifying at least one common characteristic, at step 410 computing device 202 may associate both the first online alias and the second online alias with a common contact or identity, which, in this case, may be the contact John R. Smith. In this example, computing device 202 may associate both the first online alias and the second online alias with the contact John R. Smith by creating a contact record 520 for Mr. Smith that contains information that identifies each of the known online aliases used by Mr. Smith. For example, contact record 520 may identify the following known online aliases for Mr. Smith: "johnny boy" for AIM, "jsmith" for GMAIL, "smitty" for MYSPACE, and "John R. Smith" for LINKEDIN.

In certain embodiments, contact record 520 may also contain contact information for Mr. Smith. In at least one embodiment, the contact information contained in contact record 520 for Mr. Smith may be obtained from boxes 500 and 510, which, as detailed above, may be obtained from user accounts associated with first and second online communication mechanisms 206 and 208. Upon completion of step 410, exemplary method 400 may terminate.

Figure 6A:
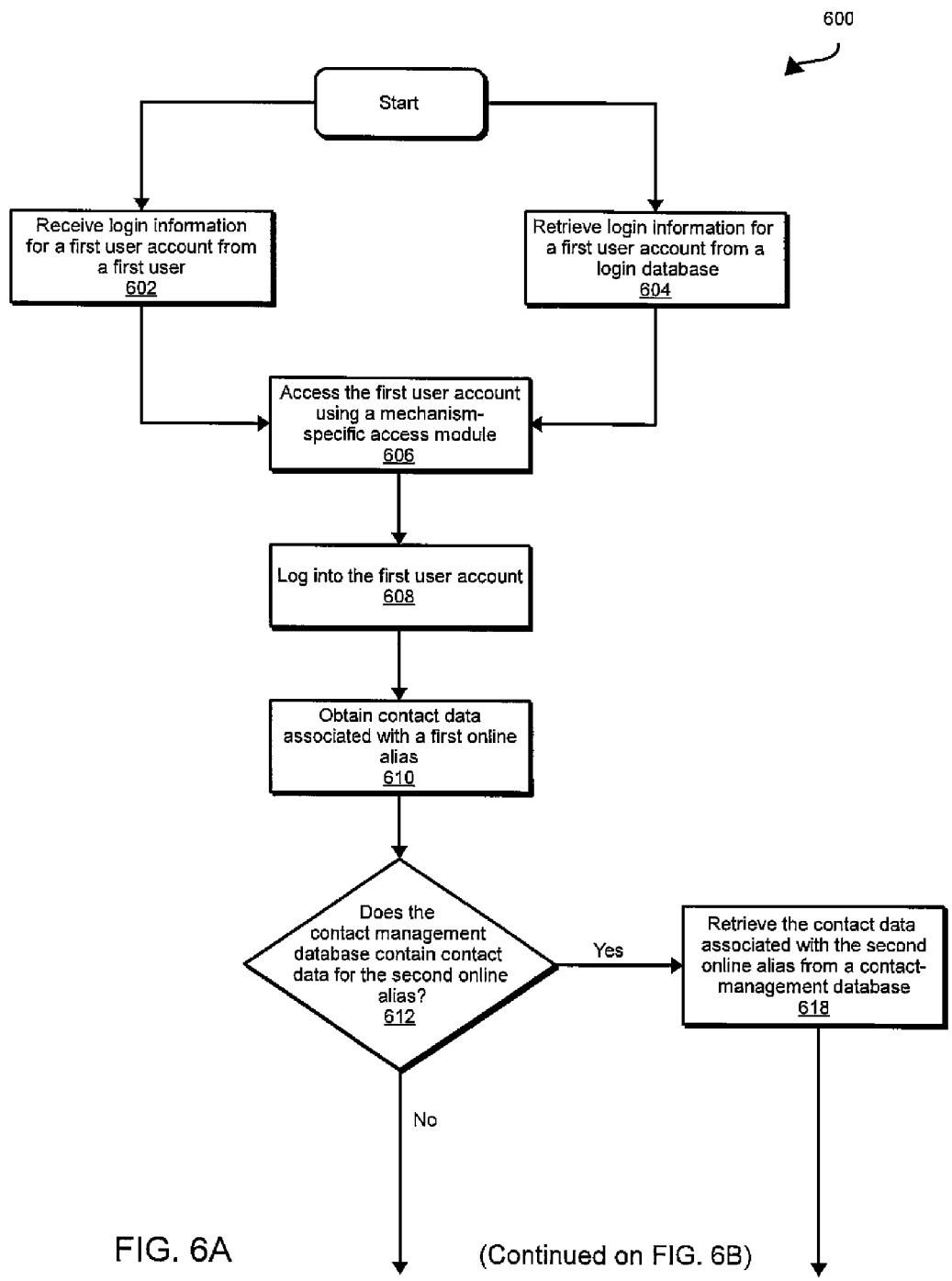
FIG. 6 is a flow diagram of an exemplary computer-implemented method for correlating online aliases with real-world identities according to an additional embodiment.
Figure 6B:
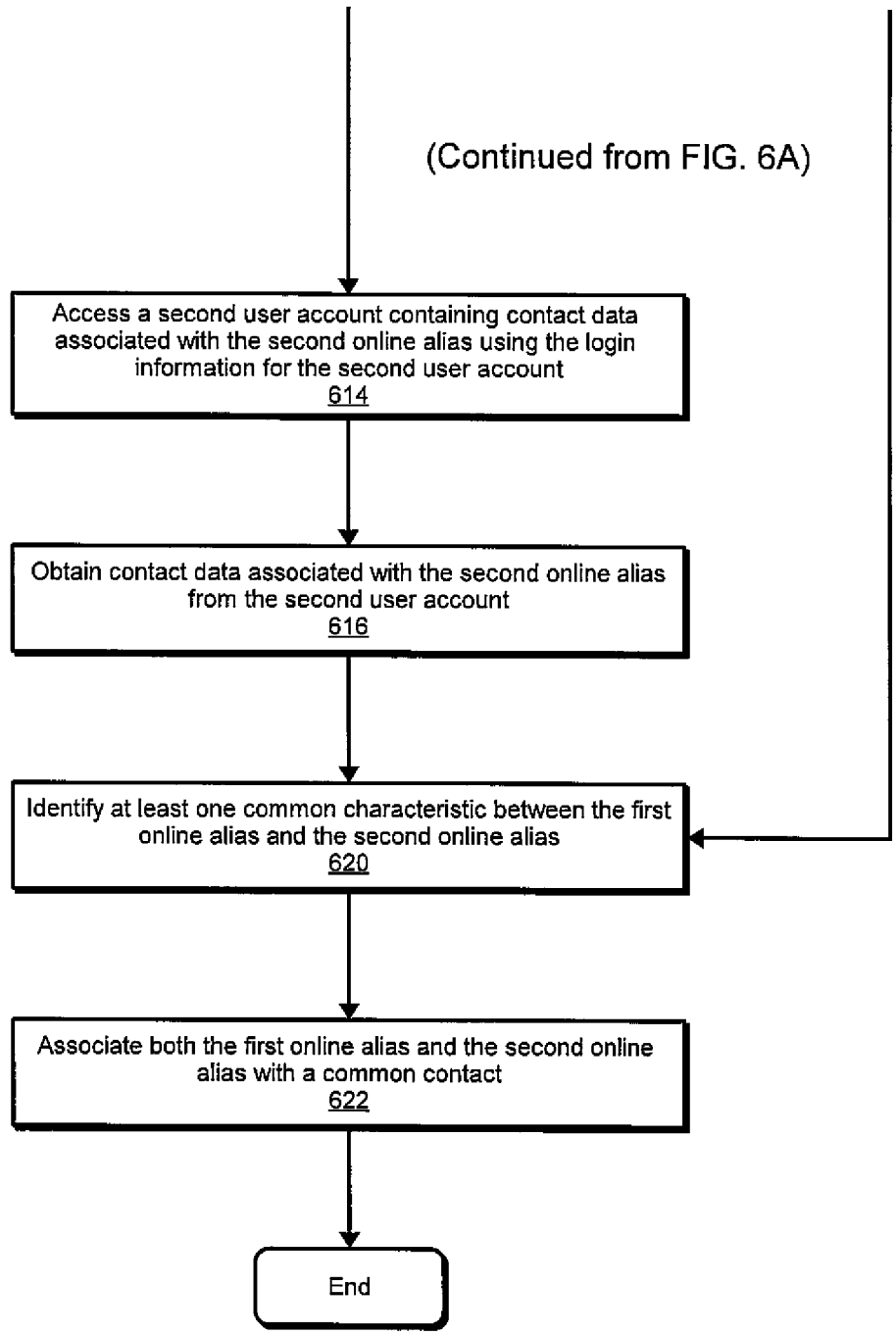

As detailed above, online communication mechanisms may be accessed using mechanism-specific access modules or plug-ins that may be tailored to access specific online communication mechanisms or services. FIG. 6 is a flow diagram of an exemplary computer-implemented method 600 for correlating online aliases with real-world identities in which online communication mechanisms may be accessed using mechanism-specific access modules. As illustrated in this figure, at step 602 a computing device may receive login information for a first user account associated with the first online communication mechanism from a user. Alternatively, at step 604 a computing device may retrieve login information for a first user account associated with the first online communication mechanism from a login-information database, such as login-information database 116 in FIG. 1.

At step 606, the computing device may access the first user account using a mechanism-specific access module, such as mechanism-specific access module 107 in FIG. 1. The phrase "mechanism-specific access module" may generally refer to modules or plug-ins that are specifically tailored to perform various mechanism-specific functions. For example, a mechanism-specific access module may be configured to access (e.g., login) or retrieve information from (e.g., screen scrape) specific online communication mechanisms.

In certain embodiments, the various functionalities performed by mechanism-specific access modules 107 may be mapped to a simple interface operated by access module 106, whose functionalities may be called as needed by access module 106 to normalize the actions performed by access module 106. For example, access module 106 may, when accessing a certain online communication mechanism, such as a web-based email service, call a mechanism-specific access module 107 specially configured to log into this specific web-based email service. Examples of mechanism-specific access modules may include, without limitation, plug-ins, specialized application programs, or the like. Mechanism-specific access modules 107 may either form a portion of, or be called by, access module 106.

At step 608, the computing device may, using the login information for the first user account, log into the first user account. At step 610, the computing device may obtain contact data associated with a first online alias from the first user account. At step 612, the computing device may determine whether a contact-management database, such as contact-management database 118 in FIG. 1, contains contact data associated with a second online alias. For example, the computing device may search contact-management database 118 to determine whether it contains contact data for the second online alias that was previously obtained from a user account associated with an online communication mechanism. If the contact-management database contains contact data for the second online alias, then control proceeds to step 618 where the computing device retrieves the contact data for the second online alias from the contact-management database. Otherwise control proceeds to step 614, where the computing device accesses a second user account containing data associated with the second online alias using the login information for the second user account. At step 616, the computing device then obtains contact data associated with the second online alias from the second user account.

At step 620, the computing device identifies, by comparing the contact data associated with the first online alias with the contact data associated with the second online alias, at least one common characteristic between the first online alias and the second online alias. At step 622, the computing device associates both the first online alias and the second online alias with a common contact identity. Upon completion of step 622, exemplary method 600 may terminate.

Figure 7:
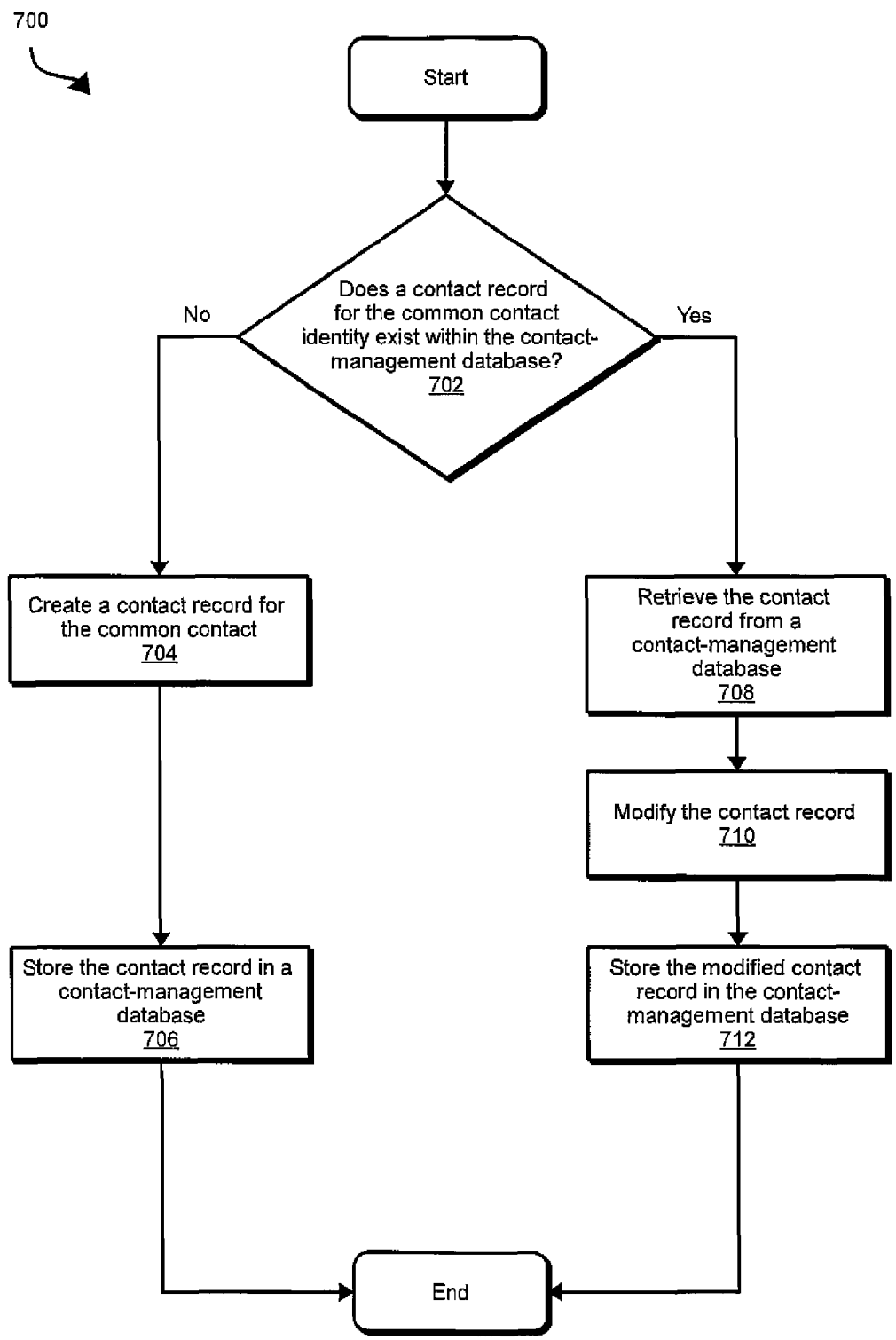
FIG. 7 is a flow diagram of an exemplary computer-implemented method for associating online aliases with common contacts or identities according to certain embodiments.

As detailed above, online aliases may be associated with contacts in a variety of ways. FIG. 7 is a flow diagram of an exemplary computer-implemented method 700 for associating online aliases with contacts according to at least one embodiment. As illustrated in this figure, at step 702, upon identifying at least one common characteristic between a first online alias and a second online alias (as detailed above in connection with step 408 in FIG. 4), a computing device may determine whether a contact record for a common contact to be associated with the first and second online aliases exists within a contact-management database, such as contact-management database 118 in FIG. 1. If a contact record for the common contact does not exist within the contact-management database, then at step 704 the computing device may create a contact record, such as contact record 520 in FIG. 5, for the common contact that associates the first and second online aliases with the common contact. At step 706, the computing device may store the contact record in a contact-management database, such as contact-management database 118 in FIG. 1.

Alternatively, if an existing contact record for the common contact to be associated with the online aliases is located within the contact-management database, then control proceeds to step 708, where the computing device may retrieve the contact record for the common contact from a contact-management database. At step 710, the computing device may modify, based on the contact data associated with the first online alias and the contact data associated with the second online alias, the contact record for the common contact.

This contact record may be modified in a variety of ways. For example, the computing device may modify the contact record by adding one or more additional online aliases for the common contact to the contact record. The computing device may also modify other contact information stored in the contact record, such as the name of the common contact, an email address stored in the contact record, a phone number stored in the contact record, a fax number stored in the contact record, a mailing address stored in the contact record, a website address stored in the contact record, an instant-messaging address stored in the contact record, or any other contact data stored in the contact record. At step 712, the computing device may store the modified contact record in the contact-management database. Upon completion of 706 or step 712, exemplary method 700 may terminate.

As detailed above, a graphical user interface may be provided for displaying a contact's name, each of the online aliases used by the contact, and the online communication mechanisms that may be used to communicate with the contact. This graphical user interface may also facilitate communication with the contact using one or more online communication mechanisms. FIG. 8 is flow diagram of an exemplary computer-implemented method 800 for providing a graphical user interface that may display contact information and online aliases for a user's contacts and facilitate communication with these contacts via one or more online communication mechanisms.

As illustrated in this figure, at step 802 a first user account associated with a first online communication mechanism may be accessed. At step 804, contact data associated with the first online alias may be obtained from the first user account. At step 806, contact data associated with a second online alias may be identified. At step 808, at least one common characteristic between the first online alias and the second online alias may be identified by comparing the contact data associated with the first online alias with the contact data associated with the second online alias. At step 810, both the first online alias and the second online alias may be associated with a common contact.

At step 812, a graphical user interface may be provided. For example, graphical-user-interface module 112 in FIG. 1 may cause a computing device, such as computing device 202 in FIG. 2, client 302 in FIG. 3, or server 310 in FIG. 3, to provide a graphical user interface. This graphical user interface may be used to display a variety of data. For example, as will be described in greater detail below in connection with FIG. 9, this graphical user interface may be configured to display a name of a contact, contact information for the contact, and one or more online aliases for the contact.

At step 814, communication between a user and a contact may be facilitated using one or more online communication mechanisms. Communication between a user and a contact may be facilitated in a variety of ways. For example, as will be described in greater detail below in connection with FIG. 9, in certain embodiments a graphical user interface may enable a user to communicate with a contact by transmitting data (such as an email or an instant message) using an online communication mechanism. Communication with a contact may also be facilitated by posting a content (such as a message) using an online communication mechanism. For example, a user may communicate with a contact by posting a message to the contact's MYSPACE page using an online communication mechanism.

In at least one embodiment, communication with a contact in step 814 may be facilitated by a mechanism-specific communication module, such as mechanism-specific communication module 111 in FIG. 1. The phrase "mechanism-specific communication module" may generally refer to modules or plug-ins that are specifically tailored to perform various mechanism-specific functions. For example, a mechanism-specific communication module may be configured to access (e.g., login) and transmit or post information using a specific online communication mechanism.

In certain embodiments, the various functionalities performed by mechanism-specific communication modules 111 may be mapped to a simple interface operated by communication module 110, whose functionalities may be called as needed by communication module 110 to normalize the actions performed by communication module 110. For example, communication module 110 may, when accessing a certain online communication mechanism, such as a web-based email service, call a mechanism-specific communication module 111 specially configured to log into this specific web-based email service. Mechanism-specific communication module 111 may then be used to send an email via this specific web-based email service. Examples of mechanism-specific communication modules 111 may include, without limitation, plug-ins, specialized application programs, or the like. Mechanism-specific communication modules 111 may either form a portion of, or be called by, communication module 110. Upon completion of step 814 in FIG. 8, exemplary method 800 may terminate.

FIG. 9 is an illustration of an exemplary graphical user interface 900 capable of implementing one or more of the embodiments described and/or illustrated herein. As detailed above, graphical user interface 900 may be used to display a variety of contact data. For example, as illustrated FIG. 9, graphical user interface 900 may display the name of a contact (row 902), contact information for a contact (rows 904-908), and each of the known online aliases for a contact (row 910). In at least one embodiment, graphical user interface 900 may also display online communication mechanisms that may be used to communicate with the contact.

For example, graphical user interface 900 may display contact data or information for the contact "John R. Smith." In this example, graphical user interface 900 may display Mr. Smith's name, a home and work address for Mr. Smith, and various phone and fax numbers for Mr. Smith. Graphical user interface 900 may also display each of the known online aliases used by Mr. Smith, such as "jsmith" for GMAIL, "johnny boy" for AIM, "smitty" for MYSPACE, "John R. Smith" for LINKEDIN, and "john.s" for EBAY.

As detailed above, graphical user interface 900 may also facilitate communication with a contact via one or more online communication mechanisms. For example, graphical user interface 900 may comprise one or more contact buttons 912 associated with specific online communication mechanisms (such as GMAIL) that may be activated by a user to facilitate communication with a contact via the specific online communication mechanism.

For example, a user may communicate with the contact "John R. Smith" via MYSPACE by activating the contact button 912 positioned next to Mr. Smith's MYSPACE alias ("smitty"). Upon activating this contact button 912, graphical user interface 900 may provide an interface for placing a post on Mr. Smith's MYSPACE page. Similarly, a user may communicate with the contact "Susan Brown" via AIM by activating the contact button 912 positioned next to Ms. Brown's AIM alias ("susan4ever"). Upon activating this contact button 912, graphical user interface 900 may provide an interface for sending an instant message to Ms. Brown via AIM.

In at least one embodiment, one or more communication modules 110 and/or mechanism-specific communication modules 111 from FIG. 1 may be used to facilitate communication with a contact. For example, communication module 110 may, upon receiving a request from a user via graphical user interface 900 to send a message to a contact via a certain online communication mechanism, such as a web-based email service, call a mechanism-specific communication module 111 specially configured to log into this specific web-based email service. Mechanism-specific communication module 111 may then access and send the email generated by the user via this specific web-based email service. As detailed above, examples of mechanism-specific communication modules 111 may include, without limitation, plug-ins, specialized application programs, or the like. Mechanism-specific communication modules 111 may either form a portion of, or be called by, communication module 110.

The exemplary embodiments described and/or illustrated herein may facilitate communication with a contact in a variety of ways. For example, graphical user interface 900 and/or modules 110 and 111 may be used to generate emails, instant-messages, posts on social or professional-networking pages, blog posts, text messages, message-board posts, or any other suitable form of communication.

Figure 10:
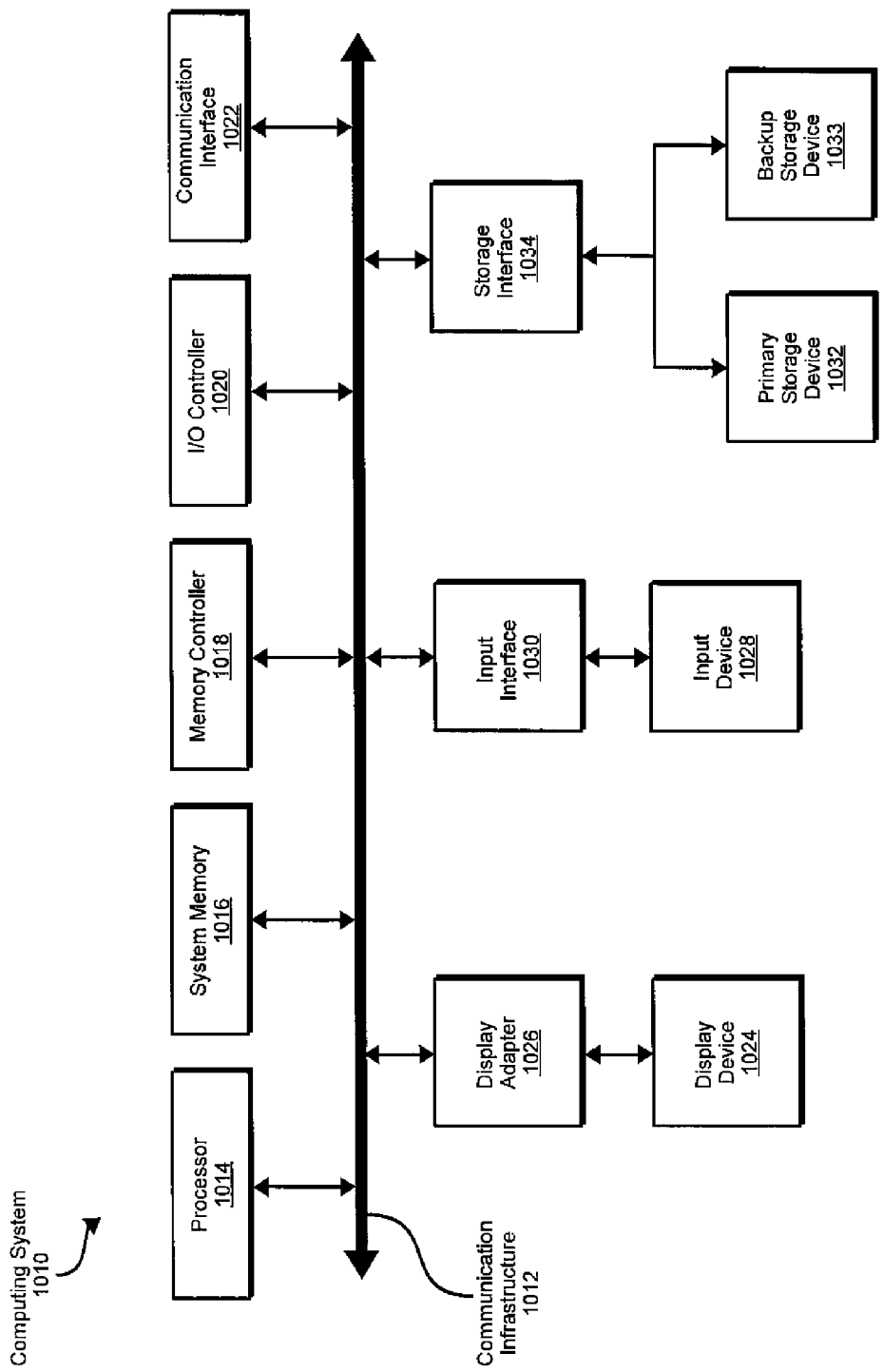
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may comprise at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the accessing, obtaining, identifying, associating, receiving, retrieving, extracting, providing, creating, storing, modifying, and facilitating steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may comprise both a volatile memory unit (such as, for example, system memory 1016) and a non-volatile storage device (such as, for example, primary storage device 1032, as described in detail below).

In certain embodiments, exemplary computing system 1010 may also comprise one or more components or elements in addition to processor 1014 and system memory 1016. For example, as illustrated in FIG. 10, computing system 1010 may comprise a memory controller 1018, an Input/Output (I/O) controller 1018, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller may perform and/or be a means for performing, either alone or in combination with other elements, one or more of the steps or features described and/or illustrated herein, such as accessing, obtaining, identifying, associating, receiving, retrieving, extracting, providing, creating, storing, modifying, and facilitating.

I/O controller 1020 generally represents any type or form of module capable of coordinating and/or controlling the input and output functions of a computing device. For example, in certain embodiments I/O controller may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the accessing, obtaining, identifying, associating, receiving, retrieving, extracting, providing, creating, storing, modifying, and facilitating steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network comprising additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the accessing, obtaining, identifying, associating, receiving, retrieving, extracting, providing, creating, storing, modifying, and facilitating steps disclosed herein. Communication interface 1022 may also be used to perform and/or be a means for performing other steps and features set forth in the instant disclosure.

As illustrated in FIG. 10, computing system 1010 may also comprise at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also comprise at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the accessing, obtaining, identifying, associating, receiving, retrieving, extracting, providing, creating, storing, modifying, and facilitating steps disclosed herein. Input device 1028 may also be used to perform and/or be a means for performing other steps and features set forth in the instant disclosure.

As illustrated in FIG. 10, exemplary computing system 1010 may also comprise a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also comprise other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, the exemplary file systems disclosed herein may be stored on primary storage device 1032, while the exemplary file-system backups disclosed herein may be stored on backup storage device 1033. Storage devices 1032 and 1033 may also be used, for example, to perform and/or be a means for performing, either alone or in combination with other elements, one or more of the accessing, obtaining, identifying, associating, receiving, retrieving, extracting, providing, creating, storing, modifying, and facilitating steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments descried and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device or medium capable of storing or carrying computer-readable instructions. Examples of computer-readable media include, without limitation, physical media such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 11:
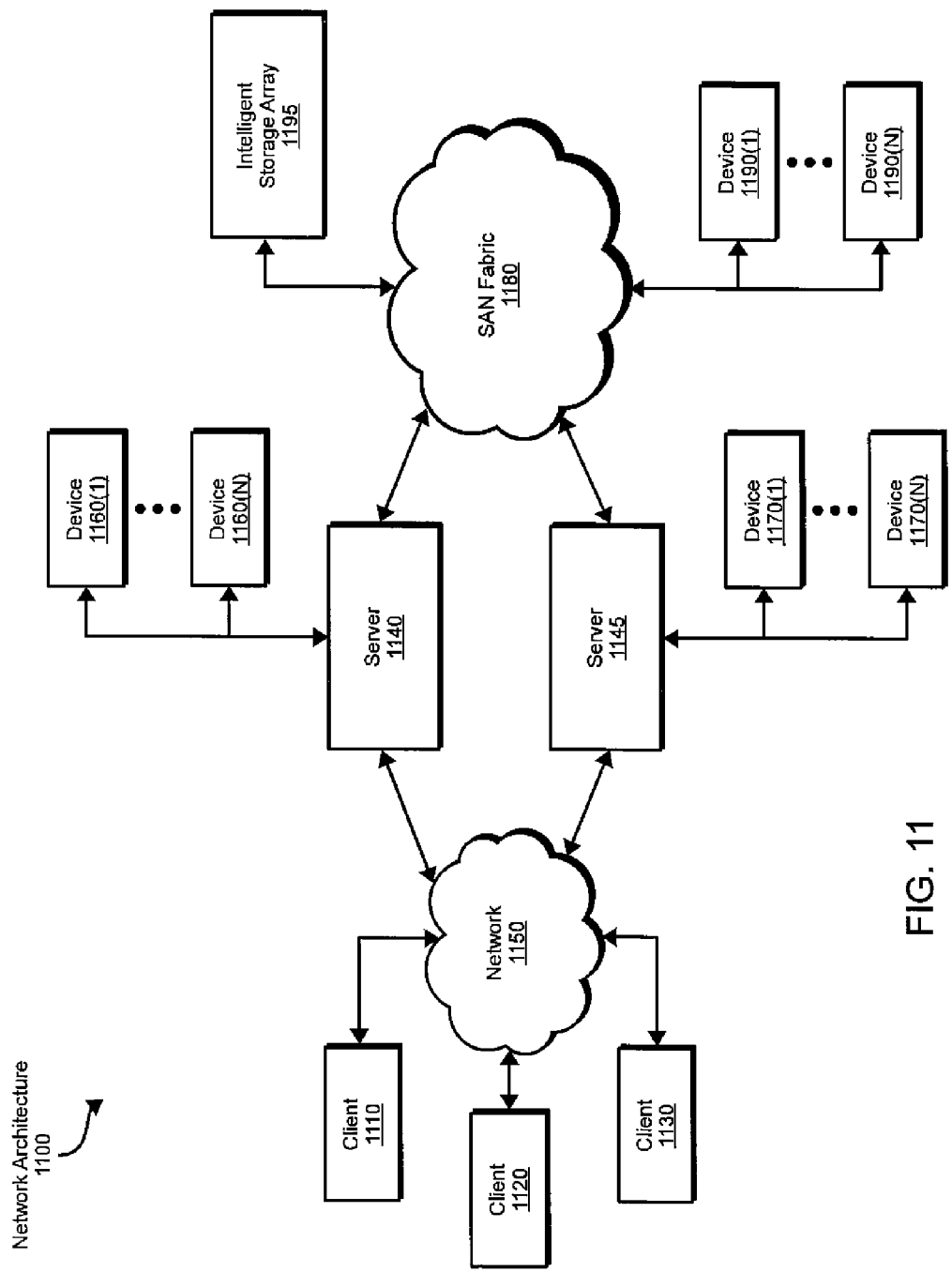
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or to run certain software applications. Network 1150 generally represents any telecommunication or computer network; including, for example, an intranet, a wide area network (WAN), a local area network (LAN), a personal area network (PAN), or the Internet.

As illustrated in FIG. 11, one or more storage devices 1160(1)-(N) may be directly attached to server 1140. Similarly, one or more storage devices 1190(1)-(N) may be directly attached to server 1145. Storage devices 1160(1)-(N) and storage devices 1190(1)-(N) generally represent any type or form of storage device or medium capable of storing data and/or other computer-readable instructions. In certain embodiments, storage devices 1160(1)-(N) and storage devices 1190(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the accessing, obtaining, identifying, associating, receiving, retrieving, extracting, providing, creating, storing, modifying, and facilitating steps disclosed herein. Network architecture 1100 may also be used to perform and/or be a means for performing other steps and features set forth in the instant disclosure.

As detailed above, computing system 1010 and/or one or more of the components of network architecture 1000 may perform and/or be a means for performing, either alone or in combination with other elements, one or more steps of the exemplary methods described and/or illustrated herein. In one embodiment, this exemplary computer-implemented method may comprise accessing a first user account associated with a first online communication mechanism, obtaining, from the first user account, contact data associated with a first online alias, identifying contact data associated with a second online alias, identifying, by comparing the contact data associated with the first online alias with the contact data associated with the second online alias, at least one common characteristic between the first online alias and the second online alias, and associating both the first online alias and the second online alias with a common contact.

In certain embodiments, accessing the first user account may comprise identifying login information for the first user account and accessing the first user account using the login information for the first user account. In addition, identifying the login information for the first user account may comprise receiving the login information for the first user account from a user or retrieving the login information for the first user account from a login-information database. User accounts may be accessed using a mechanism-specific access module.

In at least one embodiment, obtaining contact data associated with the first online alias from the first user account may comprise receiving computer-readable contact data and/or extracting human-readable contact data. The contact data associated with the first online alias may comprise a name, an online alias, an email address, a phone number, a fax number, a mailing address, a website address, and/or an instant-messaging address.

In certain embodiments, identifying the contact data associated with the second online alias may comprise identifying login information for a second user account associated with a second online communication mechanism, accessing the second user account using the login information for the second user account, and obtaining the contact data associated with the second online alias from the second user account. Identifying the contact data associated with the second online alias may also comprise retrieving the contact data associated with the second online alias from a contact-management database.

In at least one embodiment, identifying the at least one common characteristic between the first online alias and the second online alias may comprise identifying at least one common name, online alias, email address, phone number, fax number, mailing address, website address, or instant-messaging address. In addition, associating both the first online alias and the second online alias with the common contact may comprise providing a graphical user interface for displaying a name of the common contact, contact data for the common contact, and/or one or more online aliases for the common contact. Associating both the first online alias and the second online alias with the common contact may also comprise creating a contact record for the common contact and storing the contact record in a contact-management database. The contact record may contain data identifying the first online alias, the second online alias, and contact data for the common contact.

The method may also comprise modifying, based on the contact data associated with the first online alias and the contact data associated with the second online alias, a contact record for the common contact. The method may also comprise facilitating communication with the common contact using the first online communication mechanism or the second online communication mechanism. In certain embodiments, communication with the common contact may be facilitated using a mechanism-specific communication module. The method may be performed automatically and periodically or at the request of a user.

Computing system 1010 and/or one or more of the components of network architecture 1100 may also represent all or portions of exemplary system 100 in FIG. 1. For example, computing system 1010 and/or one or more of the components of network architecture 1100 may represent portions of a system for correlating online alias, comprising an access module for accessing a first user account associated with a first online communication mechanism, obtaining, from the first user account, contact data associated with a first online alias, and identifying contact data associated with a second online alias. The system may also comprise a correlation module for identifying, by comparing the contact data associated with the first online alias with the contact data associated with the second online alias, at least one common characteristic between the first online alias and the second online alias, and associating both the first online alias and the second online alias with a common contact.

The system may also comprise a login module for managing login information for user accounts for online communication mechanisms. In addition, the system may comprise a graphical-user-interface module for providing a graphical user interface for displaying a name of the common contact, contact data for the common contact, and/or one or more online aliases for the common contact. The system may also comprise a communication module for facilitating communication with the common contact using one or more online communication mechanisms.

In certain embodiments, the system may also comprise a login-information database for storing login information for user accounts associated with online communication mechanisms, a contact-management database for storing contact records and contact data obtained from user accounts, and a mechanism-specific-module database for storing mechanism-specific access modules and mechanism-specific communication modules.

As detailed above, all or portions of exemplary system 100 in FIG. 1 (such as modules 102) may represent a software application or program that, when executed by a computing device, may cause the computing device to perform one or more tasks required to correlate online aliases with real-world identities. In this embodiment, all or portions of exemplary system 100 in FIG. 1 may represent computer-readable media comprising one or more computer-executable instructions that, when executed by a computing device, may cause a computing device to access a first user account associated with a first online communication mechanism, obtain, from the first user account, contact data associated with a first online alias, identify contact data associated with a second online alias, identify, by comparing the contact data associated with the first online alias with the contact data associated with the second online alias, at least one common characteristic between the first online alias and the second online alias, and associate both the first online alias and the second online alias with a common contact.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for correlating online aliases, at least a portion of the method being performed by a computing device comprising at least one processor, the method comprising:
   identifying, for each acquaintance of a user, each known online alias of the acquaintance of the user by:
      accessing a user account of the user, the user account associated with an online communication mechanism;
      obtaining, from the user account, contact data associated with an online alias of the acquaintance of the user;
      accessing at least one additional user account of the user, the additional user account associated with an additional online communication mechanism that is different from the online communication mechanism;
      obtaining, from the additional user account, contact data associated with an additional online alias that is different from the online alias of the acquaintance of the user;
      determining, by identifying at least one common characteristic between the contact data associated with the online alias and the contact data associated with the additional online alias, that the online alias and the additional online alias represent different online aliases for the same acquaintance of the user;
   associating each known online alias of the acquaintance of the user with the acquaintance of the user by:
      creating a global contact record for the acquaintance of the user that identifies each known online alias of the acquaintance of the user, the contact record comprising information that identifies at least the online alias of the acquaintance of the user, the additional online alias of the acquaintance of the user, and contact data for the acquaintance of the user;
      storing the global contact record in a contact-management database;
   wherein the user and the acquaintance of the user are distinct.

2. The method of claim 1, wherein accessing the account comprises:
   identifying login information for the user account;
   accessing the user account using the login information for the user account.

3. The method of claim 2, wherein identifying the login information for the user account comprises at least one of:
   receiving the login information for the user account from the user;
   retrieving the login information for the user account from a login-information database.

4. The method of claim 1, wherein accessing the user account comprises accessing the user account using a mechanism-specific access module.

5. The method of claim 1, wherein obtaining the contact data associated with the online alias from the user account comprises extracting non-computer-readable contact data associated with the online alias from the user account.

6. The method of claim 1, wherein the contact data for the acquaintance of the user comprises at least one of:
- a name of the acquaintance of the user;
- an email address of the acquaintance of the user;
- a phone number of the acquaintance of the user;
- a fax number of the acquaintance of the user;
- a mailing address of the acquaintance of the user;
- a website address of the acquaintance of the user;
- an instant-messaging address of the acquaintance of the user.

7. The method of claim 1, wherein identifying at least one common characteristic between the contact data associated with the online alias and the contact data associated with the additional online alias comprises determining, by comparing the contact data associated with the online alias with the contact data associated with the additional online alias, that the contact data associated with the online alias and the contact data associated with the additional online alias share at least one of the following in common:
- a name;
- an email address;
- a phone number;
- a fax number;
- a mailing address;
- a website address;
- an instant-messaging address.

8. The method of claim 1, further comprising providing a graphical user interface that displays each known online alias of the acquaintance of the user.

9. The method of claim 8, wherein the graphical user interface further displays at least one of:
- a name of the acquaintance of the user;
- the contact data for the acquaintance of the user.

10. The method of claim 1, further comprising providing a graphical user interface that facilitates communication with the acquaintance of the user via both the online communication mechanism and the additional online communication mechanism.

11. The method of claim 1, further comprising providing a graphical user interface that facilitates communication with the acquaintance of the user via at least one of the online communication mechanism and the additional online communication mechanism.

12. The method of claim 11, wherein the graphical user interface facilitates communication with the acquaintance of the user via a mechanism-specific communication module.

13. The method of claim 1, further comprising, prior to identifying each known online alias of the acquaintance of the user, receiving a request from the user to identify each known online alias of the acquaintance of the user.

14. The method of claim 1, wherein the computer-implemented method is performed automatically and periodically.

15. A system for correlating online aliases, the system comprising:
- an access module programmed to identify, for each acquaintance of a user, each known online alias of the acquaintance of the user by:
  - accessing a user account of the user, the user account associated with an online communication mechanism;
  - obtaining, from the user account, contact data associated with an online alias of the acquaintance of the user;
  - accessing at least one additional user account of the user, the additional user account associated with an additional online communication mechanism that is different from the online communication mechanism;
  - obtaining, from the additional user account, contact data associated with an additional online alias that is different from the online alias of the acquaintance of the user;
- a correlation module programmed to:
  - determine, by identifying at least one common characteristic between the contact data associated with the online alias and the contact data associated with the additional online alias, that the online alias and the additional online alias represent different online aliases for the same acquaintance of the user;
  - associate each known online alias of the acquaintance of the user with the acquaintance of the user by:
    - creating a global contact record for the acquaintance of the user that identifies each known online alias of the acquaintance of the user, the contact record comprising information that identifies at least the online alias of the acquaintance of the user, the additional online alias of the acquaintance of the user, and contact data for the acquaintance of the user;
    - storing the global contact record in a contact-management database;
- wherein the user and the acquaintance of the user are distinct;
- at least one processor configured to execute the access module and the correlation module.

16. The system of claim 15, further comprising:
- a login module programmed to manage login information for the user's user accounts;
- a graphical-user-interface module programmed to provide a graphical user interface that displays each known online alias of the acquaintance of the user;
- a communication module programmed to facilitate communication with the acquaintance of the user via both the online communication mechanism and the additional online communication mechanism.

17. The system of claim 15, further comprising:
- a login-information database for storing login information for the user's user accounts;
- a contact-management database for storing the global contact record;
- a mechanism-specific-module database for storing mechanism-specific access modules and mechanism-specific communication modules.

18. A non-transitory computer-readable medium comprising one or more computer-executable instructions that, when executed by at least one processor of a computing device, cause the computing device to:
- identify, for each acquaintance of a user, each known online alias of the acquaintance of the user by:
  - accessing a user account of the user, the user account associated with an online communication mechanism;
  - obtaining, from the user account, contact data associated with an online alias of the acquaintance of the user;
  - accessing at least one additional user account of the user, the additional user account associated with an additional online communication mechanism that is different from the online communication mechanism;

obtaining, from the additional user account, contact data associated with an additional online alias that is different from the online alias of the acquaintance of the user;

determining, by identifying at least one common characteristic between the contact data associated with the online alias and the contact data associated with the additional online alias, that the online alias and the additional online alias represent different online aliases for the same acquaintance of the user;

associate each known online alias of the acquaintance of the user with the acquaintance of the user by:

creating a global contact record for the acquaintance of the user that identifies each known online alias of the acquaintance of the user, the contact record comprising information that identifies at least the online alias of the acquaintance of the user, the additional online alias of the acquaintance of the user, and contact data for the acquaintance of the user;

storing the global contact record in a contact-management database;

wherein the user and the acquaintance of the user are distinct.

\* \* \* \* \*

UNITED STATES PATENT AND TRADEMARK OFFICE
CERTIFICATE OF CORRECTION

| | | |
|---|---|---|
| PATENT NO. | : 8,578,009 B1 | Page 1 of 1 |
| APPLICATION NO. | : 11/960402 | |
| DATED | : November 5, 2013 | |
| INVENTOR(S) | : Keith Newstadt et al. | |

It is certified that error appears in the above-identified patent and that said Letters Patent is hereby corrected as shown below:

In the Claims

Claim 2, at column 20, lines 57 to 58, should read:

The method of claim 1, wherein accessing the user account comprises:

Signed and Sealed this
First Day of April, 2014

Michelle K. Lee
*Deputy Director of the United States Patent and Trademark Office*